United States Defensive Publication [19] (H) [11] T954,004

Dickason et al. [43] Jan. 4, 1977

[54] PROCESS FOR PREPARING CONTAINERS USING POLYESTERS

[76] Inventors: William C. Dickason, 2005 Green Lane; Winston J. Jackson, Jr., 4408 Green Springs Circle, both of Kingsport, Tenn. 37664; Willis C. Wooten, Jr., 521 Lakewood Road, Kingsport, Tenn. 37660

[21] Appl. No.: 693,450

[22] Filed: June 7, 1976

[51] Int. Cl.[2] ..... B29C 17/07

[52] U.S. Cl. ..... 264/98; 260/75 T

[57] ABSTRACT

Disclosed is a process for preparing containers, such as bottles, using a polyester of terephthalic acid, ethylene glycol, and 1,4-cyclohexanedimethanol, wherein the 1,4-cyclohexanedimethanol is from 25 to 40 mole percent of the diol. A molten parison of such polyester is extruded and then expanded in a mold to form the desired container.

2 Claims, No Sheets Drawing,

5 Pages Specification

The file of this unexamined application may be inspected and copies thereof may be purchased (849 O.G. 1221, Apr. 9, 1968).